Sept. 30, 1969     C. SCHNEIDER ET AL     3,470,422

ELECTRICAL INSTRUMENTATION AND SWITCHGEAR PANELS

Filed Jan. 25, 1968     5 Sheets-Sheet 1

Inventors:
Charles Schneider
Félix Gervais Lameyre
By
Karl W. Flocks
Attorney

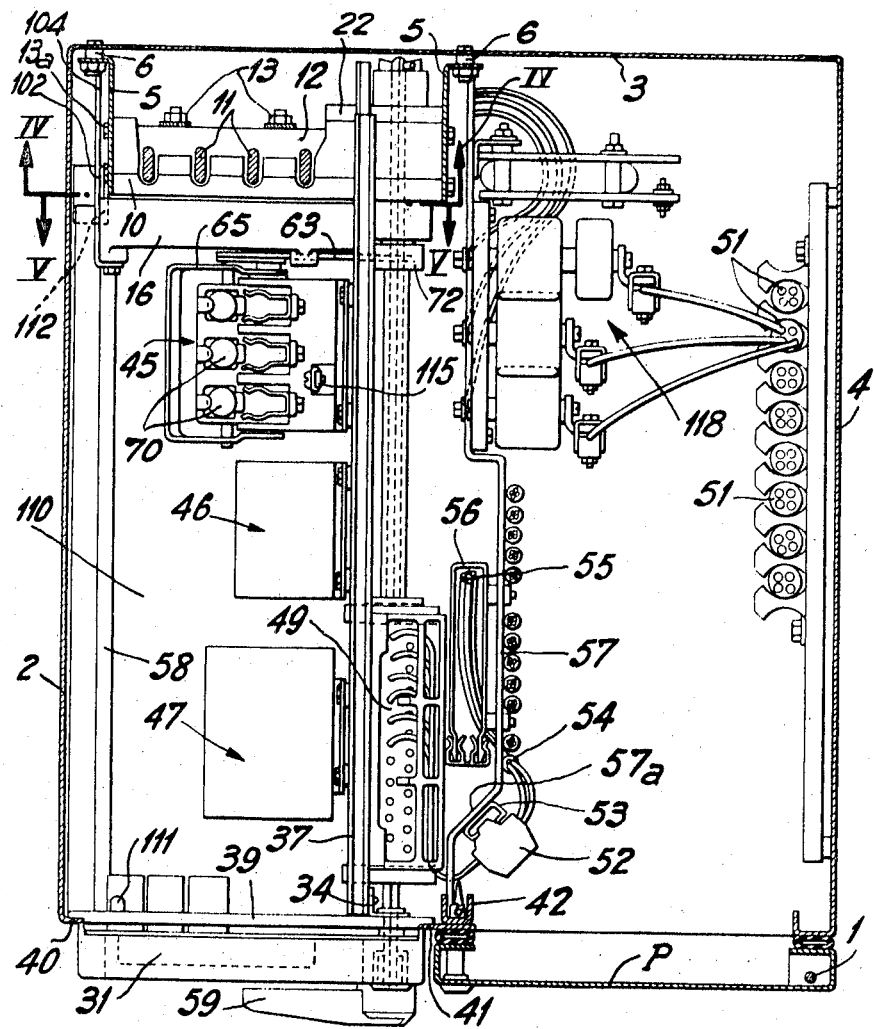

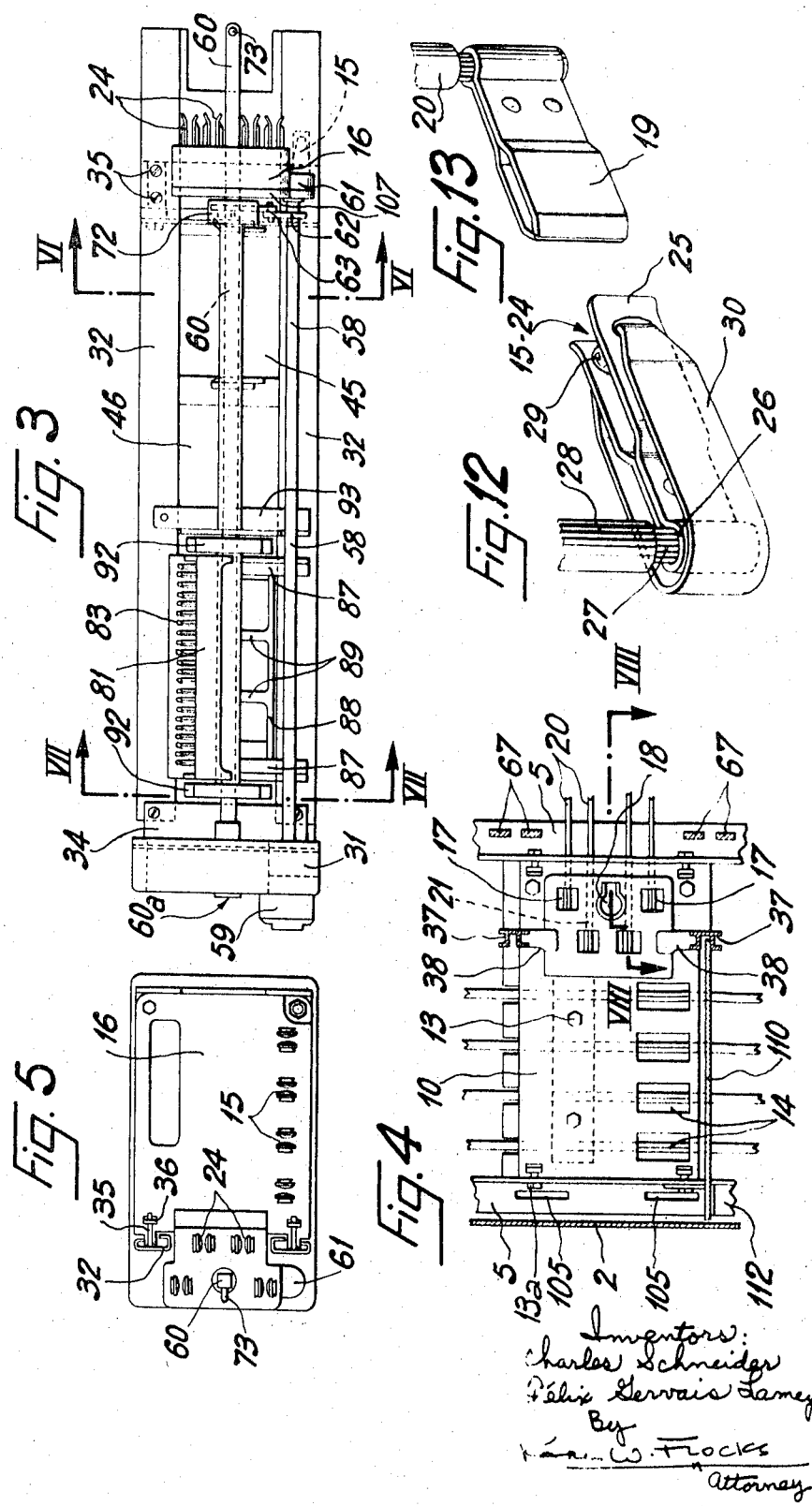

Sept. 30, 1969  C. SCHNEIDER ET AL  3,470,422
ELECTRICAL INSTRUMENTATION AND SWITCHGEAR PANELS
Filed Jan. 25, 1968  5 Sheets-Sheet 4
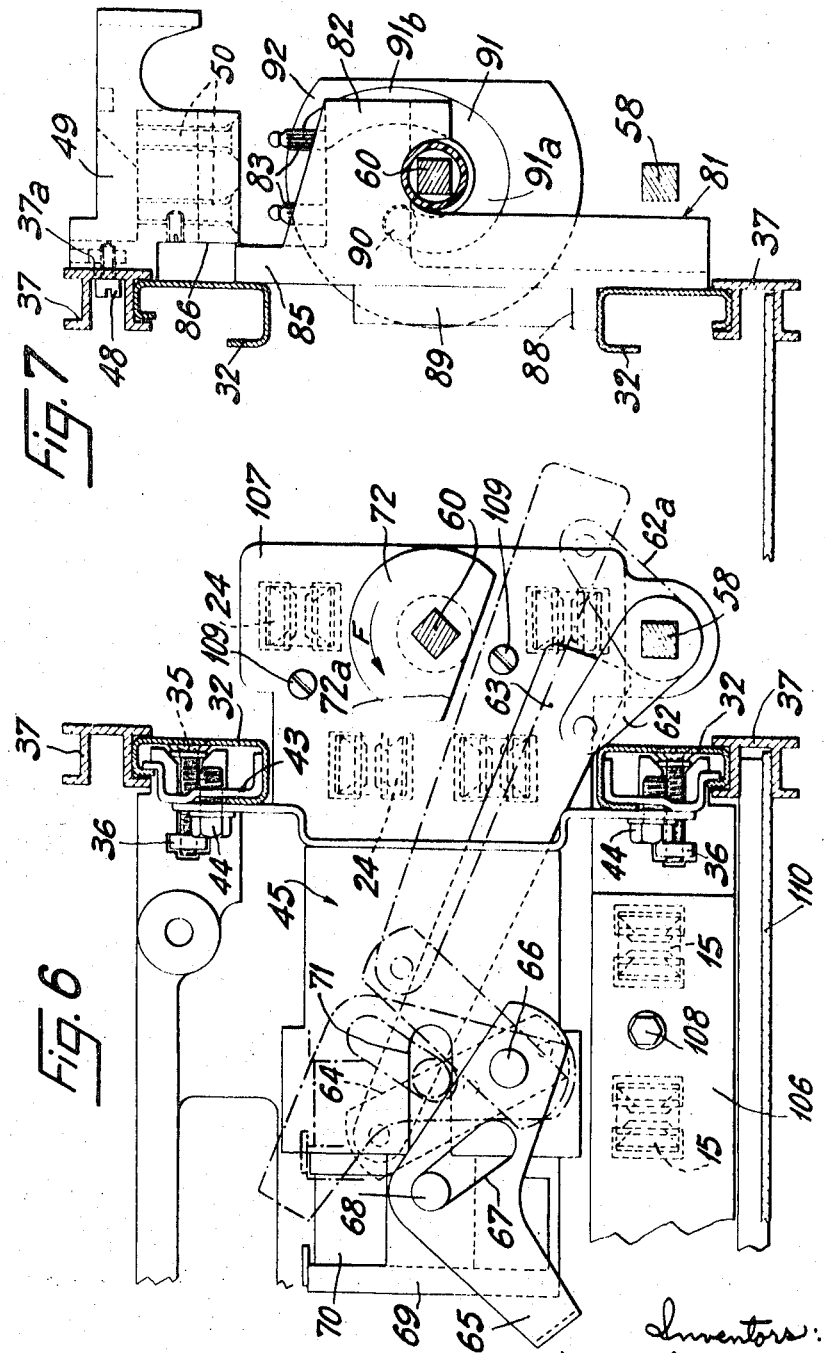

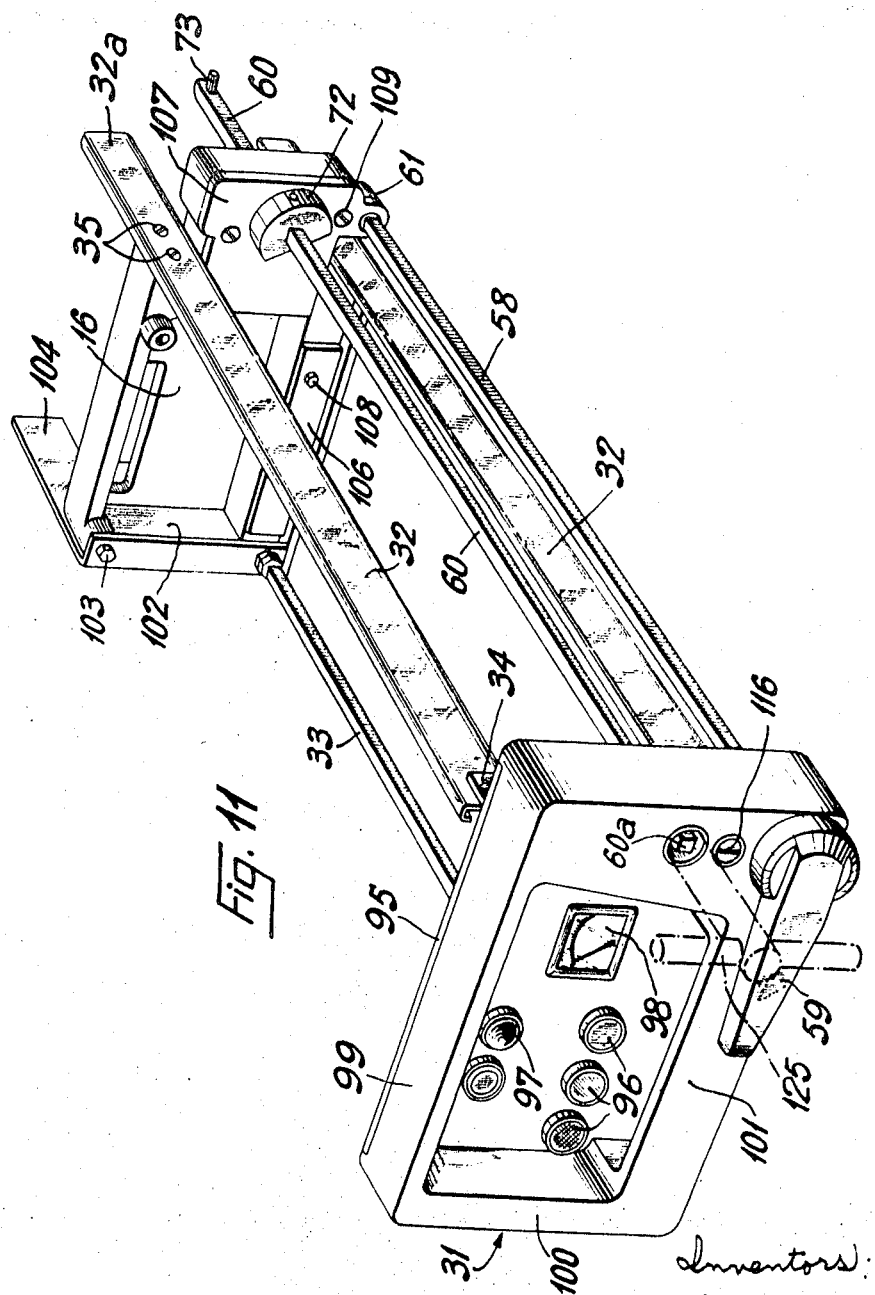

United States Patent Office 3,470,422
Patented Sept. 30, 1969

3,470,422
ELECTRICAL INSTRUMENTATION AND SWITCHGEAR PANELS
Charles Schneider, Asnieres, Hauts-de-Seine, and Felix Gervais Lameyre, Rueil-Malmaison, Hauts-de-Seine, France, assignors to La Telemecanique Electrique, Nanterre, Hauts-de-Seine, France, a French body corporate
Filed Jan. 25, 1968, Ser. No. 700,422
Claims priority, application France, Feb. 6, 1967, 93,801
Int. Cl. H02b 1/08, 1/06
U.S. Cl. 317—120    14 Claims

ABSTRACT OF THE DISCLOSURE

An electrical installation comprises a number of trays removably mounted in rack. Electrical components on the rack are supplied with power from busbars at the rear of the rack via plugs attached to the trays. Each tray has a rotatable spindle by means of which the tray can be moved to connect and disconnect the plugs and the busbars. Disconnectible connections are also provided for the output of the components on the tray.

Background of the invention

It is well known, in the context of controlling electrical installations which comprise numerous load systems and in particular motors, to employ instrumentation or switchgear panels or consoles which are consttiuted by a plurality of rack-mounted, releasable (unpluggable) trays.

Each tray for a unit, comprises all the requisite electrical elements for operation and for control of the unit, and furthermore provides the means of connection on the one hand between the input to the tray and the busbars supplying the current, and on the other hand between the output from the tray and the cables supplying the unit.

In the event of breakdown, the defective tray is withdrawn and replaced by a complete substitute tray, or, alternatively, the defective tray is removed from the rack and bench-tested.

The present invention, which is concerned with panels of this type, relates to a tray constituted by a mechanical unit so designed that the user can easily supply the requisite force for sliding it into position or withdrawing it, the control elements being arranged and combined in such a way as to automatically ensure electrical safety.

Summary of the invention

In accordance with the invention, a tray which can be plugged into a rack space, comprises a rotating spindle orientated in a direction parallel to the plug-in direction, said spindle passing through the tray from front to rear and being provided with external means for rotating it about its own axis, and furthermore being provided with at least one lateral pip or stud which co-operates with a double helical cam surface fixed to the base of the space in which the equipment or unit is housed.

Thus, the rotation of the said spindle in one direction, enables the input and output connections to be plugged in, and rotation in the other direction enables these connections to be unplugged.

In an advantageous embodiment of the invention, the tray comprises a second rotary spindle which controls a heavy current contact-breaker built into the tray, which second spindle is integral with an external handle which, when the contact-braker is in the closed position, masks off the end of the said first spindle which can only be operated by means of a separate key.

Thus, unplugging of the system tray can only be effected when the heavy current contact-breaker has been thrown and, conversely, the output conductors associated with the tray can only be made live when the unit has been plugged in properly.

In order to reinforce this latter security arrangement, to cope with the situation where the separate key has been removed before the plug-in maneuver has been completed, control of the heavy current contact-breaker by the second spindle is effected through the medium of a link associated with a crank arrangement carried by said second spindle, whilst the first spindle is provided in the plane of the said link with an arrester cam the contour of which contains a depression which allows the crank and the link to pass.

Thus, the second spindle cannot be rotated (i.e. the contact-breaker mechanism stays closed) as long as the first spindle has not yet been rotated sufficiently far to produce proper plug-in.

The heavy current contact-breaker mechanism may be an ordinary circuit-breaker. Preferably, it will be a contact-breaker which, in the conventional way, has an auxiliary break contact controlling the coil of a contact-breaker built into the tray and designed to provide on-load cut-off of the current distributed by the tray system.

This kind of design has the following advantage:

It is possible, using a key contact associated with the front part of the rack, to shunt the auxiliary contact of the contact-breaker and, consequently, to place the tray system in the test state, that is to say that all the auxiliary control circuits are interconnected in the same way as in normal operation, but the heavy current is not fed to the load equipment so that the proper operation of the said auxiliary circuits can be checked.

Preferably, said auxiliary circuits built into the tray will be connected to the conductors which go to the external control elements of the load equipment controlled by the tray system, through a set of plugs carried by a movable mounting designed to co-operate with a socket box, the displacement of the said mounting being controlled, through cam means, by the first of the said two spindles through a range of angular movement thereof which is outside the angular movement range within which said spindle co-operates with the double helical cam.

Preferably, the angular movement required for the plugging-in of the auxiliary conductors will take place when the main input and output contacts are in the fully plugged-in condition, i.e. in a condition in which the tray is firmly fixed so that the risk of plugs and sockets being improperly engaged is minimal.

In a preferred embodiment, the frame of the tray comprises a front face panel, and a rear plate carrying connector clips for current supply and feed, said front panel and said plate, both containing bearings for the two spindles, being linked by two mutually opposite, superimposed hollow profile sections which, sliding in relation to two rails fixed to the rack, which rails are likewise mutually opposite and superimposed, guide the translatory motion of the tray and also support the electrical elements carried by it.

By way of example only, an embodiment of the invention will now be described in greater detail with reference to the accompanying drawings.

Brief description of the drawings

FIG. 2 is a section on the line II—II of FIG. 1, FIG. 3 is a side elevation of a tray as used in this rack, FIG. 4 is a section on the line IV—IV of FIG. 2, and FIG. 5 is a section on the line V—V of this same figure (FIG. 2), FIGS. 6 and 7 are enlarged sections on an enlarged scale on lines VI—VI and VII—VII respectively of FIG. 3, FIG. 11 is a perspective view of a tray embodying the present invention, and FIGS. 12 and 13 are perspective views of a clip element and of a knife-blade element.

Description of the preferred embodiment

Figure 1:
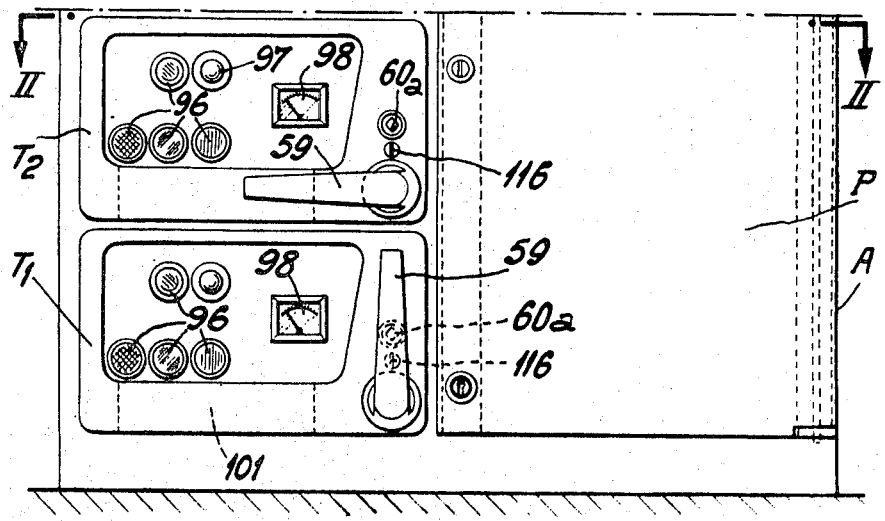
FIG. 1 is a view of the base of a rack panel made up of trays in accordance with the present invention.
Figure 9:
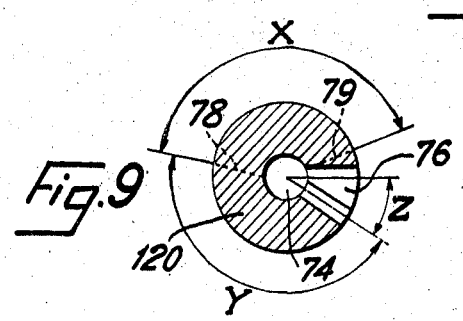
FIG. 9 is a section taken on the line IX—IX of FIG. 8.

The rack A, shown in FIG. 1, is provided on its right-hand side with a space or compartment closed off by a door P which pivots about a vertical hinge pin 1 (FIG. 2), and, on its left-hand side, with a series of trays $T_1$, $T_2$ . . . arranged one above the other, only two of which are actually shown in FIG. 1.

The body of the rack (FIG. 2) is constituted by a U-section sheet metal structure forming three vertical panels 2, 3 and 4. Fixed to the back panel 3, and spaced therefrom by spacers 6, there are pairs of vertically-spaced, sheet metal brackets 5 and between the brackets of each pair there is carried an insulating plate 10 whose rear face is grooved to receive busbars 11. The busbars are vertical, extend the height of the rack and are held in place by cross-pieces 12 held in position by bolts 13.

Each insulating plate 10 is fixed to its brackets 5 by bolts 13a the associated nuts of which are captive in edge recesses formed in the said plates. The insulating plates prevent any contact whatsoever with the busbars 11, except across pairs of apertures 14 in the plates 10. Between the apertures 14 the plates form an insulating shield across the busbars and permit the passage of the two arms only of clips 15, thus providing the normal kind of electrical security. The clips 15 are carried by an insulating plate 16 forming part of a detachable (unpluggable) tray and are designed to pick-up current from the busbars.

The plates 16 and the plates 10 are preferably all made of rigid moulded material.

Figure 8:
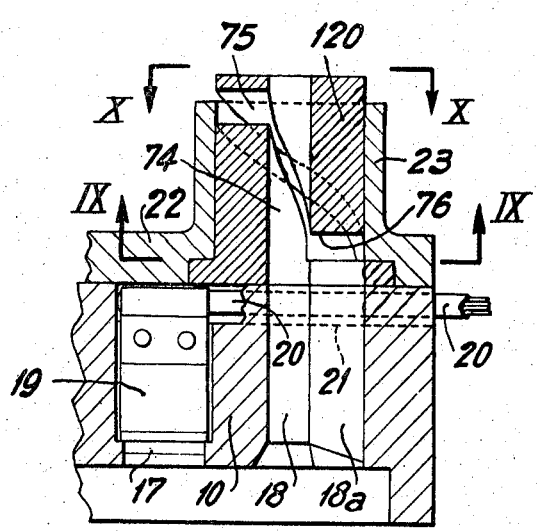
FIG. 8 is a section taken on the line VIII—VIII of FIG. 4.
Figure 10:
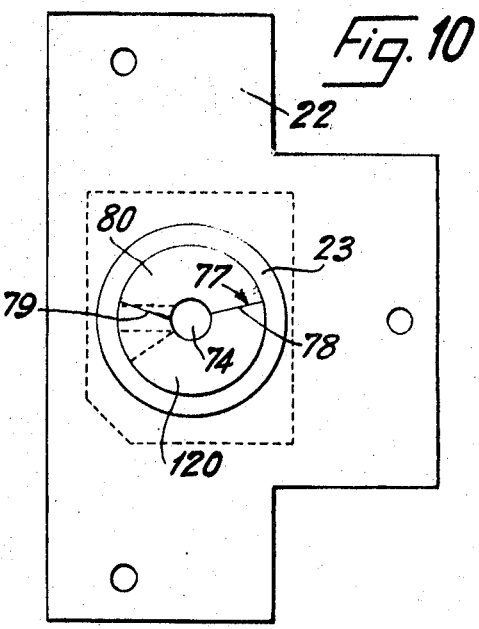
FIG. 10 is a view taken on the line X—X of FIG. 8.

Each plate 10 also has four pairs of apertures 17 similar to apertures 14, but distributed around a locking aperture 18. Through the apertures 17, access is obtained to knife-blades 19 arranged perpendicularly with respect to the ends of conductors 20 (FIGS. 8 and 13). These conductors, which constitute the electrical output of apparatus on the trays, are located in grooves 21 formed in the insulating plates 10, said grooves terminating in the end walls of the plates 10. In order to locate the conductors 20 and the knife-blades 19, T-section plates 22, one of which is shown separately in FIG. 10, are used to close off the grooves. Each T-section plate 22 has a central cylindrical boss 23 (described in the following) which is centered on the aperture 18 and contains part of the mechanism by means of which the tray is plugged in.

To co-operate with the knife-blades 19 which are accessible through pairs of slots 17, the plate 16 (FIG. 5) carries clips 24, similar to clips 15 which pick up current from the busbars 11, i.e. clips which are constituted, as FIG. 12 shows, by a flat conductor 25 folded to give the general appearance of a tuning fork, there being an eye 26 at the end opposite to the arms of the fork, into which eye there is soldered the conductors 27 of a cable 28. The faces of the arms of the clip have punched recesses 29 in which are located the extremities of a U-shaped resilient component 30 which reinforces the inherent resiliency of the arms of the clip. Beads formed when the said recesses are punched out act as contact studs on the internal faces of the arms of the clip.

The clips 15 and 24, the arms of which pass through the pairs of apertures in the plate 16, are located with clearance in the cavities formed in the front face of the plate 16 remote from the busbars 11, and are held in place by plates 106 and 107 respectively (FIG. 6), which themselves are fixed to the plate 16, by screws 108 and 109 respectively.

Each plug-in tray, carries, at one end, the insulating plate 16, and, at the other, a front plate 31 (see also FIG. 11). These two elements are held together by means of two C-section profile sections 32 facing in opposite directions and located in the same vertical plane (see also FIGS. 6 and 7), and by a rod 33, parallel to the sections 32, which enables the distance between the two plates 16 and 31 to be adjusted and fixed, so that the plates remain parallel.

The sections 32 are fitted to a plate 95 of the front panel by means of a bracket 34 (FIGS. 2 and 11), and to the plate 16 by means of the screws 35 (FIGS. 3 and 11) which engage in nuts 36 (FIG. 6) held captive in recesses formed in the edge of the plate 16.

The opposite rounded edges of the two profile sections 32, slide in longitudinal grooves in rails 37 (see also FIGS. 6 and 7). The profile of these rails is that of two outwardly facing U-sections, linked by a flat web in the same plane as one of the arms of each of the U-sections. The rails 37, are mounted in cut-outs 38 formed in the insulating plate 10. The shape of these cut-outs (FIG. 4) is such that they also provide clearance for the edges of the profile sections 32 which are engaged in the said rails.

At the end adjacent the front panel of the rack, the rails 37 are integral with cross-pieces 39 (FIG. 2) which are fixed to the rack frame via a folded edge 40 of the side wall 2, a central web 41 which, reinforced by a U-section profile 42, adjoins (through the medium of a resilient joint) the external edge of the door P. This central web 41 thus acts as a stop for the front panels of the trays.

The rails 37 are, furthermore, employed to support one edge of plates 110 which separate two superimposed trays, the other edges of these plates being held in position by a lug 111 on the cross-piece 39 carrying the rail 37, and an angle piece 112 fixed to the bracket 5.

The sections 32 which engage the rails 37 and carry the tray, permitting the latter to slide along the said rails, are furthermore used (FIG. 6), in conjunction with tabs 43 and screws 44, to mount the electrical components in a tray, which in the example illustrated include a contact-breaker 45 of unit assembly design. The components normally also comprise (FIGS. 2 and 3) at least one contactor 46 and a thermal cut-out relay 47 to cope with prolonged overload. The profile sections 42 can be extended, as required, in order to carry a larger number of components.

The central web 37a (FIG. 7) of the rails 37 is used to carry, through the medium of bolts 48, the fixed part 49 of an auxiliary contact arrangement. In the embodiment shown, this fixed part of the auxiliary contact arrangement is constituted by a box containing a set of vertically disposed sockets 50.

In the embodiment, current supplied through the busbars 11 is distributed through the clips 15 of the plate 16. It passes through the contact-breaker 45, the contactor 46 and the thermal cut-out relay 47, and is then fed via the clips 24, the knife-blades 19 and the conductors 20, to one of the distributor cables 51 (FIG. 2) each of which is associated with one tray.

The available space within the compartment closed off by the door P, can be used to connect to the conductors of the cables 51, suitable measurement transformers or other static equipment (118).

Auxiliary conductors connected to the sockets 50 in the box 49, pass through a set of terminals 52 which are resiliently attached in known fashion to C-section elements 53, going thence either to the cables 54 or to conductors 55 contained in a sleeve 56. The profile sections 53, the cables 54 and the sleeve 56 are carried by rods 57 which are fixed, at the front end, to the reinforcing piece 42 of the front central web of the rack, and engage at the rear in apertures in the folded arm of the bracket 5 closest to the centre. These rods have an oblique portion 57a on which the elements 53 are mounted thereby directing the connection terminals 52 towards the door P in order to facilitate the carrying-out of checks on the electrical condition of the terminals.

For this operation, the tray is provided, parallel to the profiled sections 32, with two square cross-section spindles arranged one above the other in the vertical plane, the lower spindle 58 being operable externally of the rack by means of a handle 59, while the upper spindle 60 is operable by means of a detachable handle which is advantageously in the form of a socket key 125 (shown in broken-line in FIG. 11).

The spindle 58, the rear extremity of which pivots in a bearing 61 integral with the plate 16, is primarily designed to control the contact-breaker 45. To this end, the spindle 58 carries a crank 62 which, through a link 63, drives a second crank 64 integral with an operating link 65. This operating link 65 pivots about the axis determined by aligned bearing stubs 66, carried on the sides of the casing of the contact-breaker. Each arm of the operating link 65 contains a slot 67 in which there engages a stud 68 integral with a moving part 69 of the contact-breaker, which part contains cut-outs 70. Each stud 68 is furthermore guided in a straight slot 71, formed in the wall of the casing perpendicular to the base.

The contact-breaker 45 is of known form and comprises an auxiliary contact 115 (FIG. 2) which is included in the circuit of the coil (not shown) of the contactor 46, in order to de-energize the latter as soon as the contact-breaker starts to open. Thus, even if the contactor has not been open-circuited by operation of a "stop" button which is provided on the front panel of the tray, there is no risk of the contact-breaker opening under load since the contactor is actuated in all cases prior to the complete opening of the contact-breaker.

With the handle 59 in the vertical position (see FIG. 1), the crank 62 is in the position 62a (FIG. 6) and, due to the combined effect, at either side of the contact-breaker, of the slot 67 and the slot 71, the swinging of the operating link forces the cut-outs to engage in the clips of the contact-breaker so that the latter is closed. However, in this position, the handle 59 masks the external end 60a of the spindle 60, and prevents any manipulation of the spindle by a socket key (see FIG. 1; tray T₁).

The spindle 60 (FIG. 6) carries a cam 72 with a flat face 72a so that a quarter-turn movement of the handle 59 can only be carried out with cam 72 in the position shown in FIG. 6. As soon as the cam, as a consequence of rotation of the spindle 60, has been moved in the direction of the arrow F, return of the handle 59 to the vertical position is prevented. Thus, the contact-breaker cannot be closed again once the spindle 60 has been operated, that is to say once the operation of unplugging has been initiated in the manner now to be described.

The spindle 60 (FIGS. 3 and 11) passes through the plate 16 and terminates in a lateral pin or dog 73. Through the locking aperture 18 (FIG. 8), the extremity of the spindle 60 penetrates into an axial central passage 74 in the boss 23. Around passage 74 there is formed a helical groove 75 into which the pin 73 extends. Preferably, the passage 74 and the groove 75 are formed in a detachable core 120 in the boss 23, since this facilitates manufacture. The groove 75 does not commence opposite radial extension 18a of the locking aperture 18, provided to pass the pin 73. Instead, there is located in line with this extension a flat portion 76 of the core piece 120 which, in relation to the axis of the passage 74, has an angular development Z.

The helical groove 75 opens out at the end of the boss 23 through an aperture 77 (FIG. 10), the angular extent Y of the groove being approximately equivalent to half a revolution. The aperture 77 is formed in the base of a recess 80 in the form of a sector subtending an angle X and limited by flat faces 78 and 79 which act as stops for the pin 73.

Thus, when a tray, having been removed, is replaced, the sections 32 are engaged in the rails 37. When these sections, whose parts 32a extend beyond the plate 16, engage in the apertures 38 in the insulating plate, the extremity of the spindle 60 carrying the pin 73 (provided always that the pin is properly orientated), engages in the aperture 18. The movement of the tray is then arrested by contact of the pin 73 with the surface 76. By means of the socket key, the spindle 60 is then rotated through the angle Z until the pin 73 engages with the groove 75.

Rotation through the angle Y, by interaction between the pin 73 and the groove 75, brings the tray up to the back of the rack. During this movement, the clips 15 on the one hand, and those 24 on the other, come into engagement respectively with the busbars 11 and the knife-blade contacts 19. Preferably, the process of engagement between the clips 24 and 15, and the busbars and the knife-blades respectively, will not be a simultaneous one, so that the forces required to insert the tray are gradually increased.

When the pin 73 leaves the groove 75 through the aperture 77, the spindle 60 can again be rotated through the angle X, the pin 73 moving between the stops 78 and 79. This final rotary movement enables the auxiliary contacts to be plugged-in in the following way:

There is a frame 81 which is slidable over the external flat face of the sections 32 opposite the box 49 containing the sockets 50. This frame 81, comprises a parallelepiped block 82, equipped with plugs 83 each designed to cooperate with a socket 50. Through the medium of its upward portion 85 which is in the form of a plate, the frame 81, during vertical movement, is located and guided between the top section 32 and a cut-back part 86, parallel to the face of the profile section, of the box 49. Further down, location and guidance are provided by the two angled portions 87 (FIG. 3) of the frame, which bear against the flat face of the lower section 32. These angled portions are linked by a cross-piece 88 which extends between the two sections 32 and which, when it meets the lower section, limits the downward travel of the frame 81. Flexing on the part of this cross-piece is inhibited by mountings 89 which likewise form stops limiting the extent of upward travel of the frame 81, by contact with the top section 32.

The frame 81 is provided at each of its ends with a cylindrical dog 90 which engages in the grooves 91 of flat cams 92. The two cams 92 co-operate with the two ends of the frame 81 and are each held in position on the spindle 60 by a locking screw. Each groove 91 has a circular portion 91a, the angular development of which corresponds to the sum of the angles Y and Z, and a spiral portion 91b, the angular development of which corresponds to the angle X. Finally, longitudinal displacement of the frame 81 and the cams 92 surrounding it, along the spindle 60, is prevented by an angle cross-piece 93 attached to the sections 32.

When, at the time of replacing the tray and after the spindle 60 has been rotated through the angle Y, the clips 15 and 24 embrace the flat conductors 11 and 19, the plugs 83 will have been brought by overall displacement of the tray into a position opposite the sockets 50 and each dog 90 is thus located at the point of origin of the circular portion 91b of cam 92. As rotation of spindle 60 continues, the interaction between the dogs 90 and the grooves 91 lifts the frame 81, engaging the plugs 83 in the sockets 50.

The pin 73 at the end of the spindle 60, having passed through the core piece 120 and being tight up against the base of the recess 80, thus places the spindle 60 in a state of tensile stress so that the tray is held in position without any longitudinal play. Since, furthermore, it is possible to control precisely the position of the cams 92 on the spindle 60, due to the provision of the locking screws, it is possible with each manipulation of the tray, to ensure that the plugs 83 are precisely aligned with the sockets 50. Consequently, the engagement of the plugs 83 in the sockets presents no difficulty at all. In order to facilitate the extraction of the plugs, they may be constituted by an assembly of small diameter cylindrical rods which form a barrelled structure, so that high diametral resiliency is obtained.

Thus, when rotation of the spindle 60 has been completed for the plug-in operation, all the auxiliary conductors are in position and under tension. However, that one of these conductors which supplies the coil of the contactor is then disconnected by the contact 115. It is possible, using a contact which can be operated by means of a key provided on the front panel, to shunt the contact 115 in order to place all the auxiliary conductors in their normal condition thus enabling testing of the corresponding circuits to be carried out without switching in the main power. Preferably, the key-operated contact will be located at 116 on the front panel so that it is impossible to reclose the contact-breaker whilst the key controlling this contact is still in position.

The backing plate of the front panel 31 also carries various contact buttons, as indicated at 96, including a start button and a stop button, indicator lamps 97 and, possibly, an ammeter 98. On the backing plate, there is fixed a frame constituted by a rectangular moulded block 99 with a window 100 giving access to the elements 96 to 98. This block is reduced, at its lower part, to form a flat web 101 which serves as a handle for withdrawing the tray.

The block 99 has a number of advantages:

It protects the elements 96 and 98 against shocks or clumsy handling, it facilitates the operation of the handle 59 and the socket key, by bringing them to a position in front of the plane in which the monitoring and control elements 96 and 97 are located, and, finally, acts as a visor, so that a better view of those of the indicator lamps 97 which are lit, can be obtained.

When the tray is pushed into position, contact between the pin 73 and the internal surface 76 of the boss 23, prevents the operator, whose hand is gripping the handle web 101, from being injured by hitting the front panel of the tray situated immediately below.

In the embodiment illustrated, four conductors are used, that is to say, three phase-conductors and a neutral conductor. However, for safety, the tray assembly is earthed through a sheet metal angle piece 102. This angle piece, fixed to the plate 16 by a bolt 103 and the rod 33, terminates in two flat lugs 104 designed to engage in openings 105 (FIG. 4) formed in the brackets 5 carrying the insulating plates 10.

Thus, even before the clips 15 have engaged with the busbars 11, the lugs 104 contact the edge of the slots 105 at some point or other, thus earthing to the rack, any voltages which may accidentally have rendered the tray live due to faulty insulation.

It will be understood that modifications may be made to the embodiments described hereinbefore, in particular by the substitution of equivalent technical means, without departing from the scope of the appended claims.

We claim:

1. A housing for electrical instrumentation and components comprising in combination a rack, a series of electrical supply busbars located in the rack, a compartment in the rack, a member at the back of the compartment having a series of elements each formed with a double helical cam surface, a series of trays slidably mounted in said compartment, each tray having a first rotatably mounted spindle disposed parallel to the direction in which the tray is slidable, means external to the tray for rotating said spindle, and, a laterally-extending stud on the first spindle for co-operation with the said cam surface of one of the said elements.

2. A housing as claimed in claim 1 and further comprising on at least one of the trays, a contact-breaker mounted on the tray, a second spindle rotatably mounted on the tray, an operating handle on the second spindle external of the tray, and a socket key for rotating the first spindle, the position of the handle being such that with the contact-breaker in a "closed" position, the handle masks the socket key.

3. A housing as claimed in claim 2 and further comprising a crank on said second spindle, and a link associated with the crank for operating said contact-breaker, an inhibit cam on said first spindle having a cam surface permitting movement of said crank and said link.

4. A housing as claimed in claim 2 and further comprising an auxiliary contact on said contact-breaker, and a contactor controlled by said auxiliary contact.

5. A housing as claimed in claim 4 and further comprising a front panel on said tray, a key-operated contact located on said front panel in shunt connection with said auxiliary contact, said operating handle on said second spindle masking said key-operated contact when said contact-breaker is "closed."

6. A housing as claimed in claim 1 in which said first spindle controls the linear translatory movement of a mounting for plug-in elements which co-operates with a fixed box containing complementary sockets for control and supply circuits, said first spindle effecting control by means of an external annular interval of co-operation between said laterally extending stud and said double helical cam surface and through the medium of an additional cam.

7. A housing as claimed in claim 1 and further comprising a front panel for each tray, a rear plate for each tray, contact clips on said rear plate for current supply and current output, bearings for said first spindle in said front panel and said rear plate, profile sections joining together said front panel and said rear plate, said profile sections having oppositely-directed hollow portions and being arranged in spaced relationship one above the other, and support rails on which said profile sections are slidably mounted, said support rails also supporting electrical components located in said tray.

8. A housing as claimed in claim 7 and further comprising, for each tray, a plate of electrically insulating material locating part of said busbars, a locking aperture in said plate through which said first spindle passes, and access apertures in said plate for said contact clips for permitting contact between said busbars and some of said clips and between others of said clips and knife-blade contacts integral with output conductors from said tray.

9. A housing as claimed in claim 8 in which the said contact clips and the said knife-blade contacts are electrically secured to the ends of cables loosely located in cavities in external faces of said rear plate and said plate of electrically insulating material and maintained in said cavities by cover plates mounted against said external faces.

10. A housing as claimed in claim 9 in which the access apertures in said plate of electrically-insulating material corresponding to said knife-blade contacts are distributed over said plate of electrically-insulating material around said locking aperture, and in which said cover plate mounted against the external face of said plate of electrically-insulating material has a boss centred over said locking aperture, said boss housing said double helical cam surface.

11. A housing as claimed in claim 10 in which the said double helical cam surface has a point of commencement in said boss which faces said locking aperture and is angularly offset in relation to said locking aperture, and in which there is provided a circular sector zone perpendicular to said first spindle thus acting as a stop for said laterally-extending stud.

12. A housing as claimed in claim 11 in which said double helical cam surface opens into the external face of said boss, and in which the length of said first spindle between the front face of said panel and said laterally-extending stud is slightly less than the distance from said external face of said boss to the front face of said panel.

13. A housing as claimed in claim 12 in which a predetermined angular movement of said laterally-extending stud over said external face of said boss corresponds with the plugging-in of the contact clips for said control and supply circuits.

14. A housing as claimed in claim 7 in which said mounting for said plug-in elements is positioned laterally against said profile sections and is provided at each of its ends with a dog engaged in the grooves of face cams fixed to said first spindle.

References Cited

UNITED STATES PATENTS

| | | | |
|---|---|---|---|
| 2,997,629 | 8/1961 | Wolski | 317—120 |
| 3,041,506 | 6/1962 | Schlessel et al. | 317—120 |
| 3,168,683 | 2/1965 | Brokaw | 317—120 |

FOREIGN PATENTS 1,509,035 12/1967 France.

LARAMIE E. ASKIN, Primary Examiner

G. P. TOLIN, Assistant Examiner

U.S. Cl. X.R.

317—117